United States Patent
Garcés Erice et al.

(10) Patent No.: US 11,645,258 B2
(45) Date of Patent: May 9, 2023

(54) PRESERVING METADATA CONTEXT IN A HYBRID CLOUD CONTEXT

(71) Applicant: INTERNATIONAL BUSINESS MACHINES CORPORATION, Armonk, NY (US)

(72) Inventors: Luis Garcés Erice, Rueschlikon (CH); John G. Rooney, Zurich (CH); Daniel Nikolaus Bauer, Birmensdorf (CH); Peter Urbanetz, Au (CH)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 17/303,302

(22) Filed: May 26, 2021

(65) Prior Publication Data

US 2022/0382731 A1    Dec. 1, 2022

(51) Int. Cl.
*G06F 16/22* (2019.01)
(52) U.S. Cl.
CPC .............................. *G06F 16/2272* (2019.01)
(58) Field of Classification Search
CPC .................................................. G06F 16/2272
See application file for complete search history.

(56) References Cited

U.S. PATENT DOCUMENTS

| | | | |
|---|---|---|---|
| 10,678,866 B1* | 6/2020 | Ranganathan | G06F 40/197 |
| 2010/0235649 A1* | 9/2010 | Jeffries | G06F 21/6209 |
| | | | 726/28 |
| 2013/0007063 A1 | 1/2013 | Kalra | |
| 2013/0104042 A1* | 4/2013 | Meaney | G11B 27/34 |
| | | | 715/716 |
| 2016/0217299 A1* | 7/2016 | Sosnovsky | G06F 21/6227 |
| 2018/0084050 A1 | 3/2018 | Trachy | |
| 2019/0364099 A1 | 11/2019 | Thakkar | |
| 2020/0089539 A1 | 3/2020 | Klinger | |
| 2020/0272544 A1 | 8/2020 | Carvelli | |
| 2022/0019784 A1* | 1/2022 | Wen | G06F 40/289 |

OTHER PUBLICATIONS

Developer Salesforce, "External Data Metadata Overview," [accessed on May 26, 2021], 5 pages, The Wayback Machine, Retrieved from the Internet: <URL: https://web.archive.org/web/20210121061037/https://developer.salesforce.com/docs/atlas.e n-us.bi_dev_guide_ext_data_format.meta/bi_dev_guide_ext_data_format/bi_ext_data_schema_overview.htm>.

Wikipedia, "Preservation metadata", Wikipedia, the free encyclopedia, [accessed on May 26, 2021], 6 Pages, Retrieved from the Internet: <URL: https://en.wikipedia.org/wiki/Preservation_metadata#Current_Developments_in_Preservation_Metadata%20for%20Archival%20purposes>.

* cited by examiner

*Primary Examiner* — Huawen A Peng
(74) *Attorney, Agent, or Firm* — Douglas M. Crockatt

(57) ABSTRACT

A technique for retaining a context in which data resides independently of a data store from which the data originates is disclosed. In relation to a method aspect of the technique, a computer-implemented method provides data with related first metadata, both originating from a data store and extracts the data and the related first metadata independently from the data store. A universal unique identifier of a portion of the data to which portion specific first metadata exists is created as part of the related first metadata. The universal unique identifier of the portion of the data is integrated into the related first metadata, thereby creating modified first metadata as an independently manageable and linkable representation of the related first metadata.

20 Claims, 7 Drawing Sheets

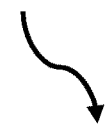

| 102 | providing data with related first metadata, both originating from a data store |
|---|---|

| 104 | extracting the data and the related first metadata independently from the data storage |
|---|---|

| 106 | creating a universal unique identifier (UUID) of a portion of the data to which portion specific first metadata exists as part of the related first metadata |
|---|---|

| 108 | integrating the UUID of the portion of the data into the related first metadata, thereby creating modified first metadata as an independently manageable and linkable representation of the related first metadata |
|---|---|

FIG. 1

PRESERVING METADATA CONTEXT IN A HYBRID CLOUD CONTEXT

BACKGROUND

Field of the Invention

Embodiments of the invention relate generally to a method for retaining a context in which data resides, and more specifically, to a computer-implemented method for retaining a context in which data resides independently of a data store from which the data originate. Embodiments of the invention relate further to a metadata linkage system for retaining a context in which data resides independently of a data store from which the data originate, and a computer program product.

Related Art

As more and more data fuels the economy, data management, data security and data governance become essential for organizations in every industry. In recent years, the difficulties related to of data management have steadily increased. There are several reasons for this: e.g., the complexities of big data, cloud hosting, self-service analytics and tightening regulations. As a consequence, effective data management has become a top priority for most enterprises and governmental organizations. However, getting there remains a challenge.

Since the emergence of data warehousing techniques, the importance of metadata — especially during the extraction, transformation, and loading (ETL) phases—has increased more and more. Additionally, new types of data from various sources have become an integral component of enterprise data management, like, unstructured and semi-structured data and Internet-of-Things (IoT) data during the continuous digitization of the word. The intensive usage of self-service analytics—often in the context of marketing and customer relation management applications—has made data catalogs mandatory in many enterprise application contexts. Thereby, semi- or unstructured data are collected, e.g., from non-transactional customer activity in different channels. Such data often falls into the category of "behavioral" data. Metadata is an important means mapping and visualizing relationships and structures of such data, e.g., to transactional data which is of great value in understanding customer decisions, buying patterns and customers influence among themselves.

As a result, the corporate data pipeline has become much more complex, and data catalogs, as well as other metadata, may now play a critical role in dealing with the ever-increasing amount of corporate data. Data catalogues were originally introduced to help data analysts understand data and define their relationships. Before, most data analysts worked blindly, so to speak, i.e., without any insight into data set contexts and/or their quality and meaning. That meant that data analysts had to spend a lot of their time finding data, understanding data and re-creating data sets that already existed. With the advent of data catalogs, these problems were resolved as these catalogs offered data analysts a novel way to manage these data inventories and make the data sets available. Today, they are vital components of data, data stewardship, data governance, and data curation.

In addition, artificial intelligence (AI) and machine learning (ML) generate and use metadata of different types to efficiently manage the large amount of company data efficiently. Often, for one type of data, a plurality of different metadata may exist in order to get as much as possible out of existing data. The metadata may be related to traditional metadata for transactional or analytical purposes, as well as security metadata, AI related metadata or the management of behavioral data.

In some of these contexts, some documents have already been published. For example, document US 2019/0 364 099 A1 describes a hybrid cloud computing system that is configured to generate a mapping that contextualizes virtual objects that have been migrated between a private data center and a public cloud computing system based on the location of the objects. Such a mapping is retained to reveal the true hybridity of the hybrid cloud, rather than showing two different views of a private data center (or private cloud) and a public cloud. In this context, metadata may play an instrumental role.

Another example can be seen in document US 2013/0 007 063 A1 which provides an approach to facilitate real-time execution of computations of data based on context information upon collection, storage, retrieval or use of the data. This context information may also be described as metadata. Thereby, a serialization of the one or more computations of the data or corresponding context information is associated with the one or more data items for processing by the one or more nodes in which the data may be stored.

However, the problem of coordinating different metadata for the same set of data remains a significant challenge, especially, if the data may relate to different sets of metadata, which may be acquired and/or—at least in part—managed independently.

Therefore, there may be a need for a technology which at least enables the transferring and synchronization of data and their context between different systems and/or which at least enables access and processing of data and their context from different systems.

SUMMARY OF THE INVENTION

According to one aspect of the present invention, a computer-implemented method for retaining a context in which data resides independently of a data store from which the data originate, may be provided. The method may comprise a step of providing data with related first metadata. Both the data and the first metadata may originate from a data store. The method may further comprise a step of extracting the data and the related first metadata independently from the data store. The method may further comprise a step of creating a universal unique identifier (UUID) of a portion of the data to which portion specific first metadata exists as part of the related first metadata. The method may further comprise a step of integrating the UUID of the portion of the data into the related first metadata, thereby creating modified first metadata as an independently manageable and linkable representation of the related first metadata.

According to another aspect of the present invention, a metadata linkage system for retaining a context in which data resides independently of a data store from which the data originates may be provided. The system may comprise a processor and a memory, communicatively coupled to said processor. Said memory may store program code portions that, when executed, enable the processor to provide data with related first metadata, both originating from a data store. Said program code portions may further enable the processor to extract the data and the related first metadata independently from the data store. Said program code portions may further enable the processor to create a universal unique identifier (UUID) of a portion of the data to which portion specific first metadata exists as part of the related first metadata. Said program code portions may further enable the processor to integrate the UUID of the portion of the data into the first related metadata, thereby creating modified first metadata as an independently manageable and linkable representation of the related first metadata.

The proposed computer-implemented method for retaining a context in which data resides independently of a data store from which the data originates may offer multiple advantages, technical effects, contributions and/or improvements:

The technical solution provided here may represent a significant advance in managing data and associated metadata. The more metadata may exist for an existing set of data, the more the need may grow to manage the metadata independently of the data, at least for a period of time. This may be required if the data and the metadata may be created independently or during a transfer of the data from a data source to a data destination (e.g., from a private data center to a cloud computing data center), i.e., if a serialization of the data and/or the metadata may be required.

As a tactical advantage, a plurality of metadata may be copied and/or updated independently of the related serialized data. The advantageous concept may also allow that the metadata and the data to come from several different systems and not just from the data store in which the underlying data may reside. Furthermore, new metadata may be added without the requirement to change the organization of the existing metadata and the organization of the existing underlying data sets.

As a consequence, the concept proposed here may unfold its rich value in many areas of data management. This may apply, e.g., to data security—e.g., when additional access control lists (ACL) may be introduced—in the field of machine learning—e.g., when additional annotations for the data under a different logical view may become available—and in the field of data analytics—e.g., when new behavioral data and interpretable relations to transactional data may become available.

Furthermore, the concept proposed here may also be integrateable without conflict into existing metadata management concepts like Apache Parquet. However, the concept proposed here goes significantly beyond the scope of e.g., the Apache Parquet concept.

It may also be noted that the advantageous concept may unfold its complete value in a complete cloud computing environment or in a hybrid cloud computing environment.

In the following, additional embodiments of the inventive concept—applicable for the method as well as for the system—will be described. Any one or more of the following embodiments may be implemented in combination.

According to an optional embodiment, the method may further comprise a step of encoding or serializing the data independently of the first metadata. Alternatively, or additionally, the method may further comprise a step of encoding or serializing the first metadata independently of the data. The encoding or serializing the data and/or the first metadata may comprise or enable at least one of a treatment, storing, and processing of the data and/or the first metadata, respectively. For example, the data and/or the first metadata may be encoded or serialized for transferring them to a new destination, i.e., a new storage system.

By encoding or serializing the data and/or the first metadata, a linkage between the data and the first metadata may be lost. Due to the step of integrating the UUID into the first metadata, the linkage—e.g., and thus the context of the data represented by the first metadata — may be retained, e.g., maintained or re-establishable. This means that the linkage is preferably not lost to the modified metadata.

According to an optional embodiment, the method may further comprise a step of decoding or de-serializing the data and the first metadata independently of one another. Alternatively, or additionally, the method may further comprise a step of re-establishing a linkage (e.g., the afore-mentioned linkage) between the data and the first metadata by using the modified first metadata. Alternatively, or additionally, the data and the first metadata may be materialized (e.g., stored) independently of one another, e.g., in a target system. By using the modified first metadata, the linkage may be functionally re-established in the target system. For example, the functions to control access to the data or to process the data or to filter the data may be equally operative in both the source system and the target system based on the re-established linkage.

According to an optional embodiment, the method may further comprise a step of relating second metadata to the portion—i.e., to the same portion—of the data. Examples of the second metadata may comprise at least one of an access control list (ACL), a classification schema, archive frequency data and deduplication data, or a portion of the metadata which is related to the portion of the data. Alternatively, or additionally, the method may further comprise a step of integrating the UUID with respect to the portion of the data in the second metadata, as a result of which modified second metadata are generated as an independently manageable and linkable representation of the related second metadata. The UUID integrated in the modified second metadata may represent a (e.g., second) linkage to the (e.g., original) data, i.e., the provided data, or the portion thereof.

According to an optional embodiment, the method may further comprise a step of encoding or serializing the data independently of the second metadata. Alternatively, or additionally, the method may further comprise a step of encoding or serializing the second metadata independently of the data. The encoding or serializing the data and/or the second metadata may comprise or enable at least one of a treatment, storage, and processing of the data and/or the second metadata, respectively. For example, the data and/or the second metadata may be encoded or serialized for transferring for transferring them to a new destination, i.e., a new storage system.

By encoding or serializing the data and/or the second metadata, a (e.g., second) linkage between the data and the second metadata may be lost. Due to the step of integrating the UUID into the second metadata, the—i.e., a second—linkage (e.g., and so the context of the data represented by the second metadata) may be retained (e.g., maintained or re-establishable). That is, the—e.g., second—linkage is preferably not lost to the modified metadata.

According to a further optional embodiment, the method may further comprise a step of decoding or de-serializing the data and the second metadata independently of one another. Alternatively, or additionally, the method may further comprise a step of re-establishing a linkage—i.e., the afore-mentioned second linkage—between the data and the second metadata by using the modified second metadata. Alternatively, or additionally, the data and the second metadata may be materialized (e.g. stored) independently of one another, e.g., in a target system. By using the using the modified second metadata, the (e.g., second) linkage may be functionally re-established at the target system. For example, functions for controlling access, processing or filtering the data may be equally operative in the source system and in the target system based on the re-established (e.g., second) linkage.

According to an optional embodiment of the method, the modified first and/or the modified second metadata may be copied (e.g., transferred) or updated (e.g., processed) independently of the portion of the data. The modified first, and optionally the modified second metadata, may be collectively denoted as metadata closure.

According to an optional embodiment, the method may further comprise a step of storing the portion of the data and the modified first metadata, and optionally the modified second metadata, according to requirements of a storage architecture which is different to the storage architecture of the data store. Eventually, the portion of the data and the modified first metadata (and optionally the modified second metadata) may be stored as part of the (e.g., complete and/or provided) data.

For example, the data may be provided by or in a source system comprising the data store. The data and the modified first metadata, and optionally the modified second metadata, may be stored in a target system using the storage architecture different to the storage architecture of the data store. Alternatively, or additionally, the source system and the target system may be different computing environments.

In any embodiment, the first metadata and/or the second metadata may be indicative of, e.g., access rights. For example, the source system may be a database. Alternatively, or in addition, the first metadata and/or the second metadata may originate from an access rights database. The specific first metadata (which may exist as part of the related first metadata) and/or the specific second metadata (which may exist as part of the second metadata) may be indicative of one or more access rights for the portion of the data (i.e., data access right, DAR). The target system may be a file system. In the target system the linkage may be re-established using the modified first metadata and/or the modified second metadata by storing the access rights in an ACL of the file system according to the UUID.

According to an optional embodiment of the method, the UUID may be created as a hash function value of the portion of the data. By way of example, the portion of the data may be linked to the related (e.g., the specific) first metadata and/or to the related (e.g., the specific) second metadata without including the UUID in the data (e.g., in association with the portion of the data). No change of the data may be required.

According to an optional embodiment of the method, the data store or the source system may be, or comprise, at least one of a repositories, a database, an object-storage, a file system, and an email (mail system) system, or the like.

According to an optional embodiment of the method, the modified first metadata and/or the modified second metadata are built according to a Parquet format. For example, the step of integrating the UUID into the first metadata and/or the second metadata when creating the modified first metadata and/or the modified second metadata may use the Parquet format. According to an optional embodiment of the method, the UUID may be part of a footer, e.g., of the Parquet format.

Any feature or step disclosed herein in the context of the method aspect may be implemented by the related system.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings:

FIG. 1 shows a flowchart of an embodiment of the computer-implemented method for retaining a context in which data resides independently of a data store from which the data originates.

Figure 2:
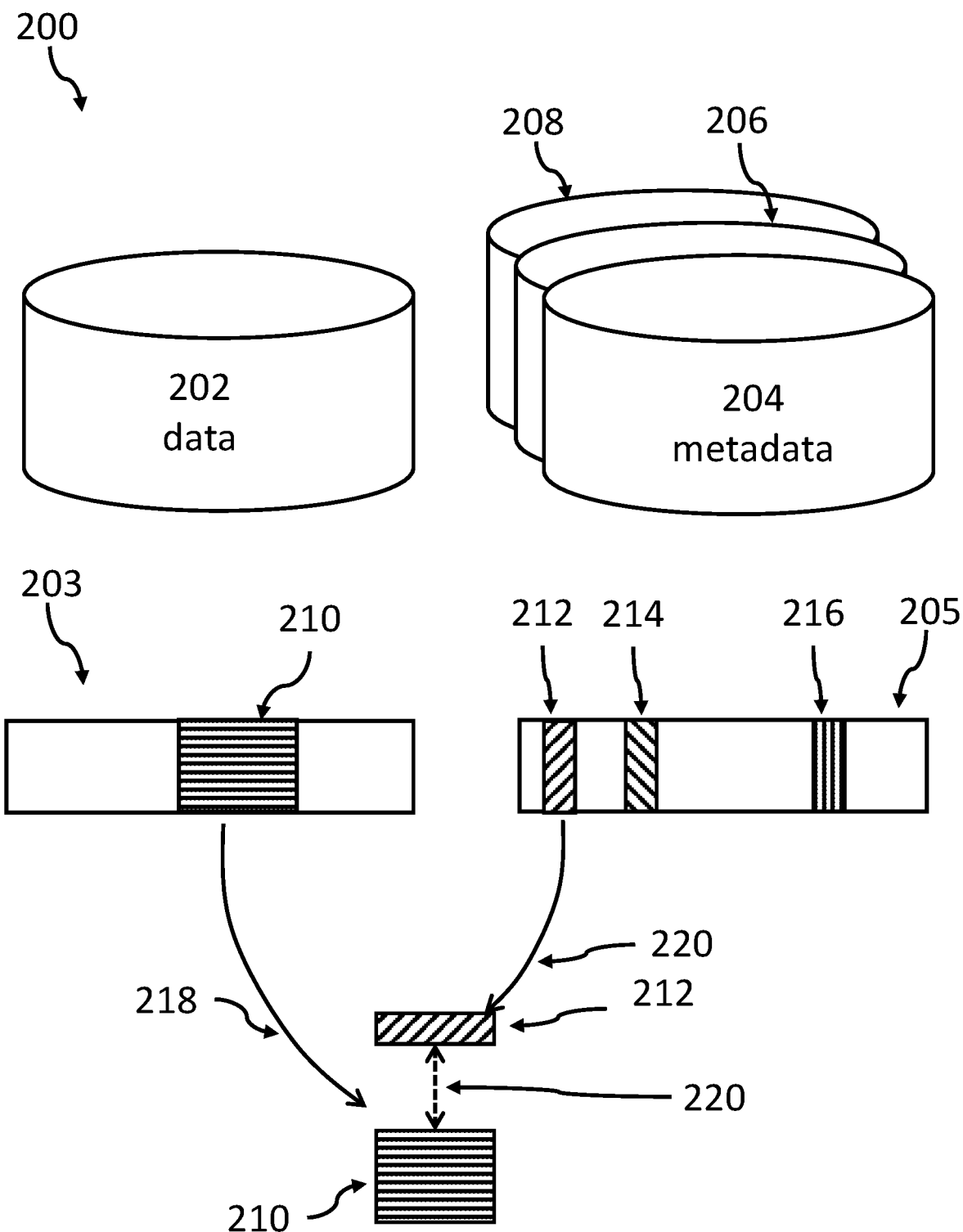

FIG. 2 schematically illustrates an exemplary implementation of the step of extracting the data and the related first metadata independently from the data store.

Figure 3:
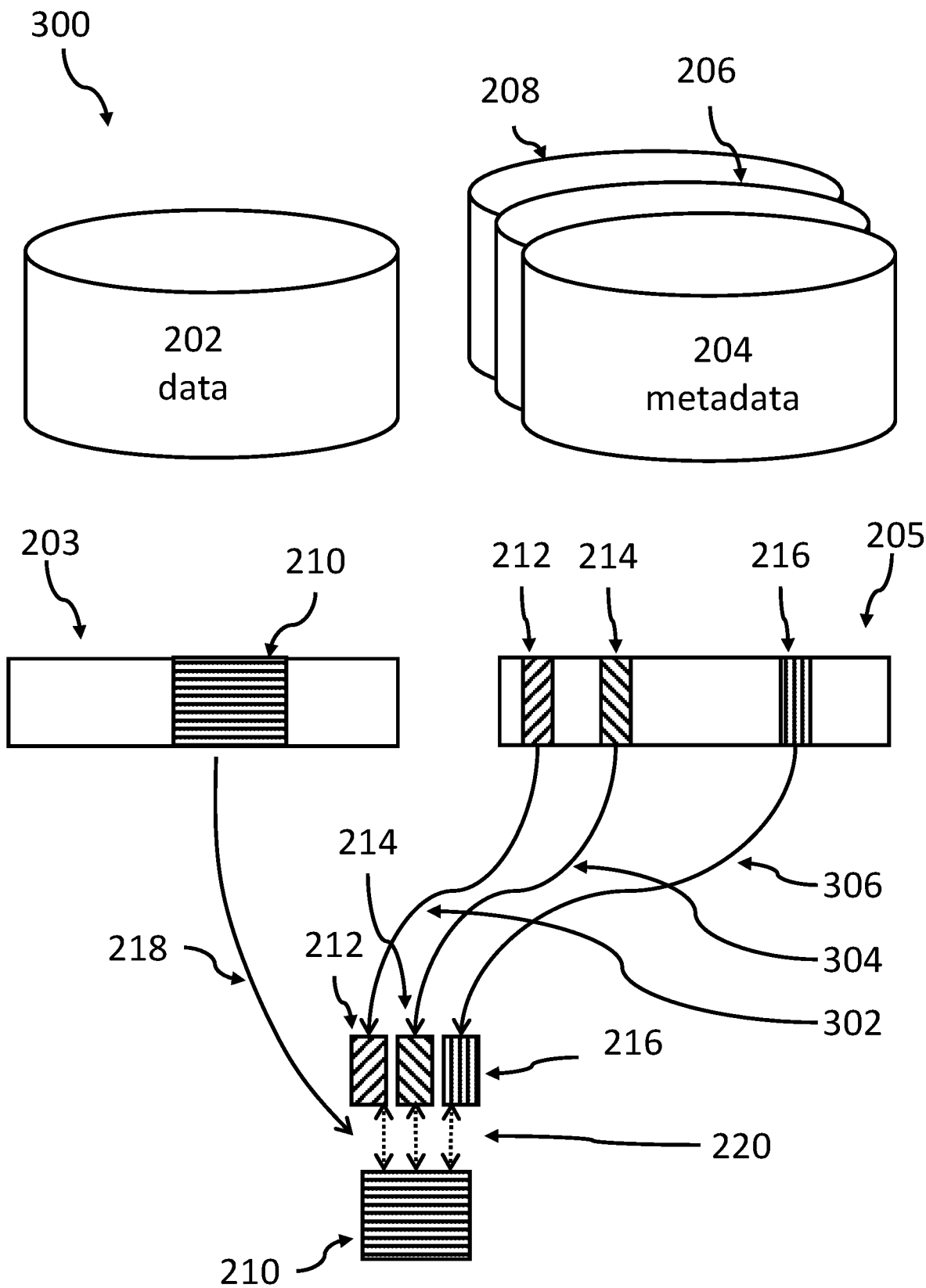

FIG. 3 schematically illustrates an exemplary implementation of the optional step of relating second metadata to the portion of the data.

Figure 4:
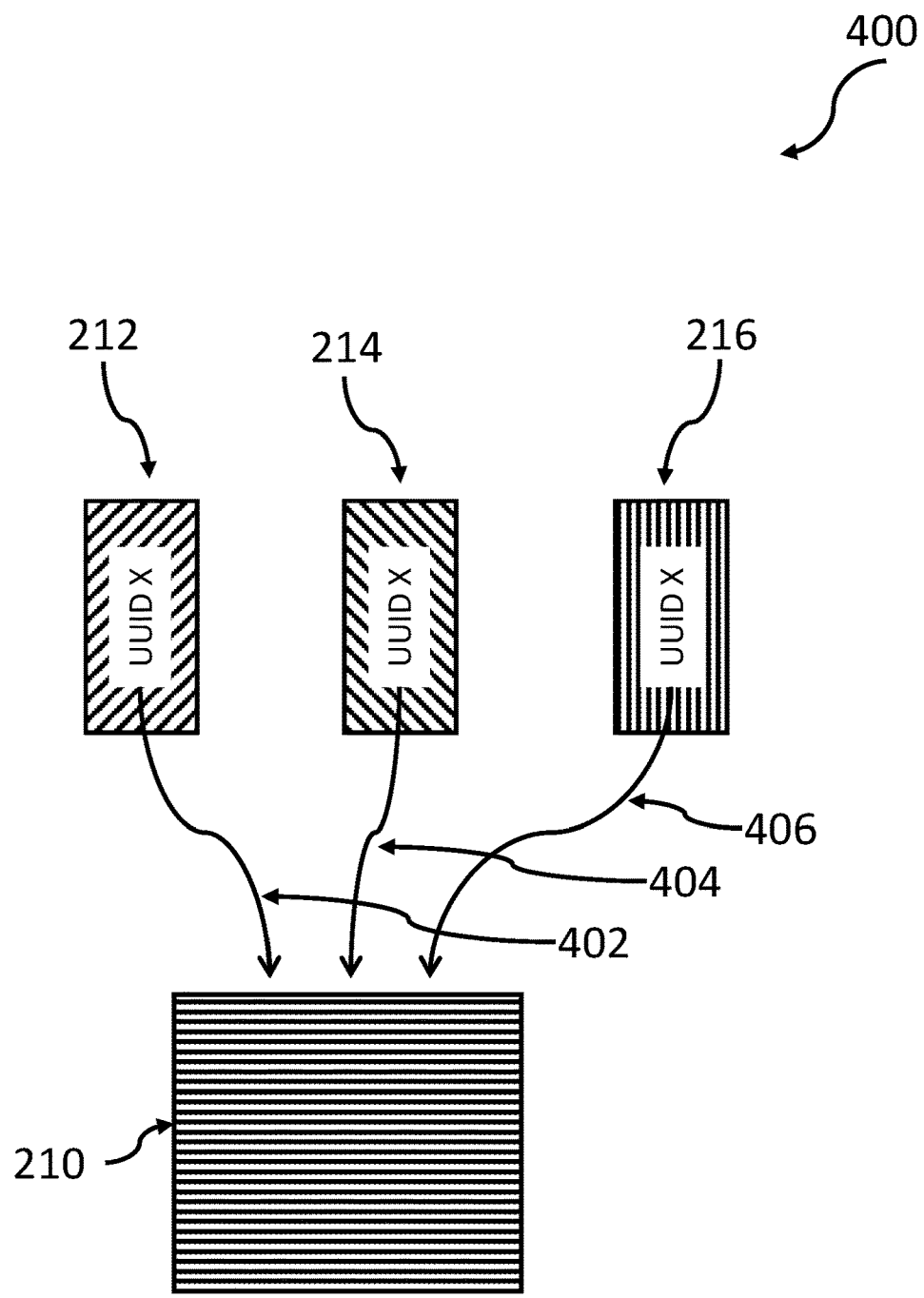

FIG. 4 schematically illustrates an exemplary implementation of the steps of creating a UUID and integrating the UUID into the related first metadata and/or the related second metadata.

Figure 5:
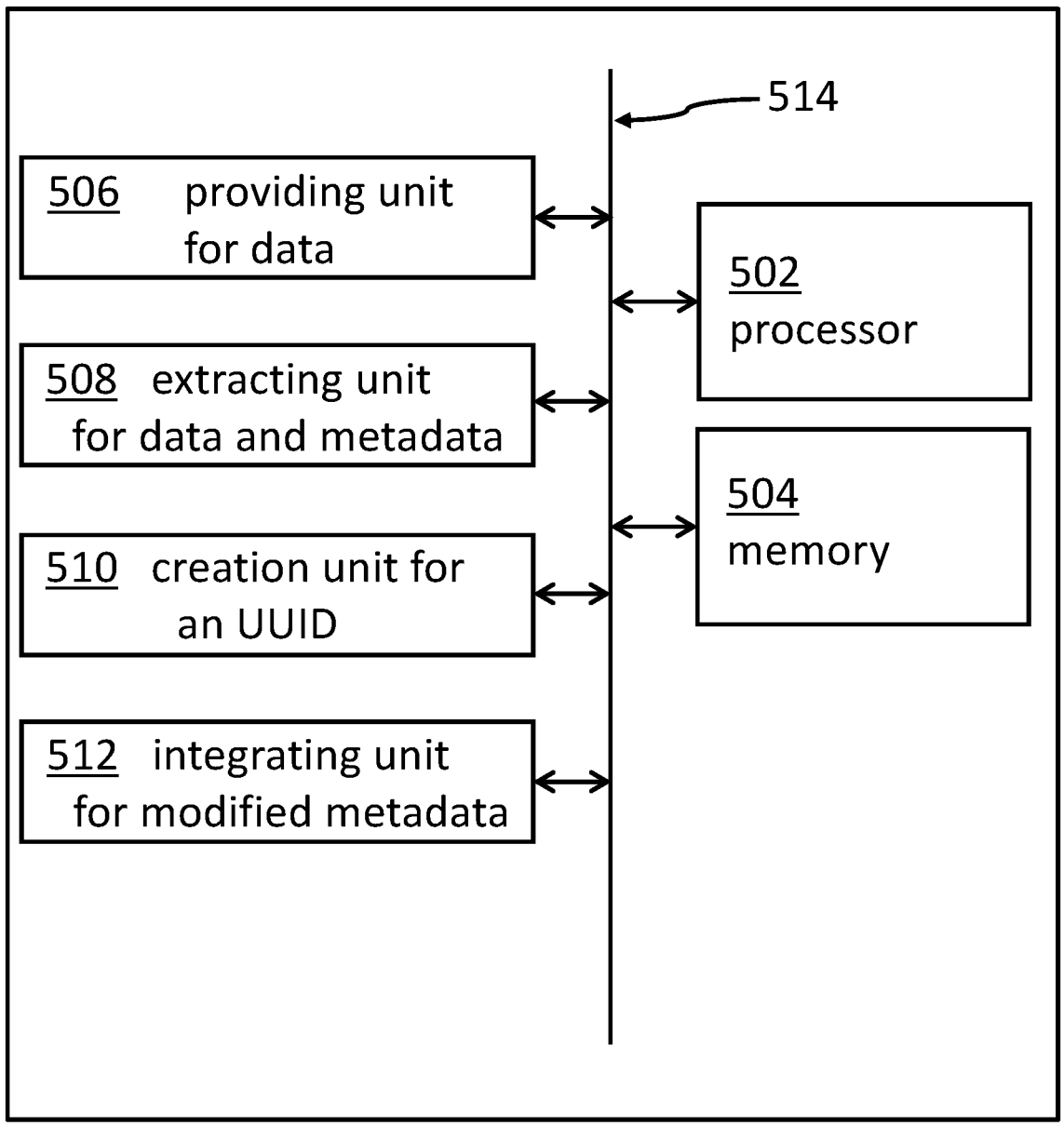

FIG. 5 shows a block diagram of an embodiment of the metadata linkage system for retaining a context in which data resides independently of a data store from which the data originates.

Figure 6:
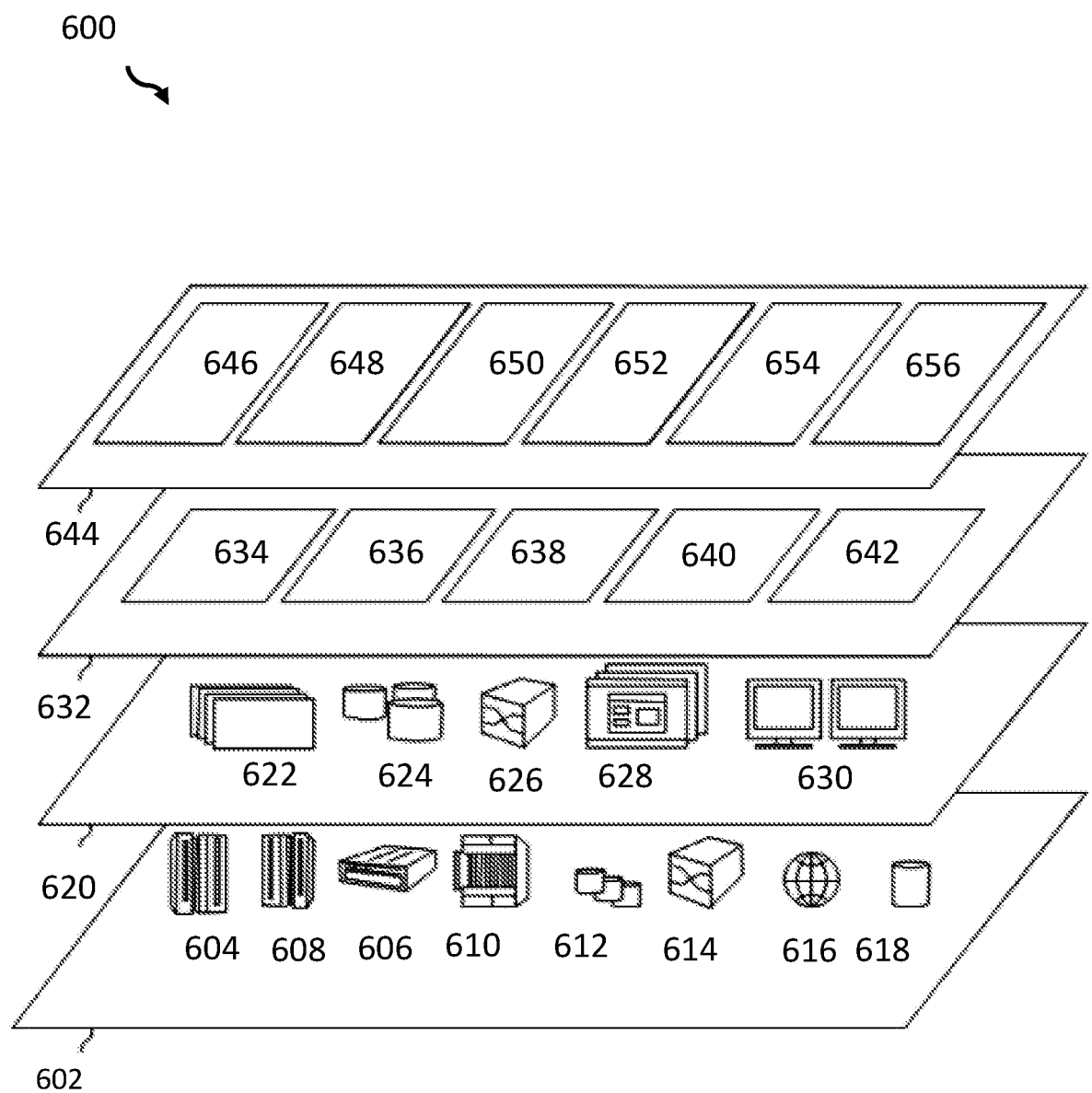

FIG. 6 shows an embodiment of a cloud computing system comprising also the system according to FIG. 5.

Figure 7:
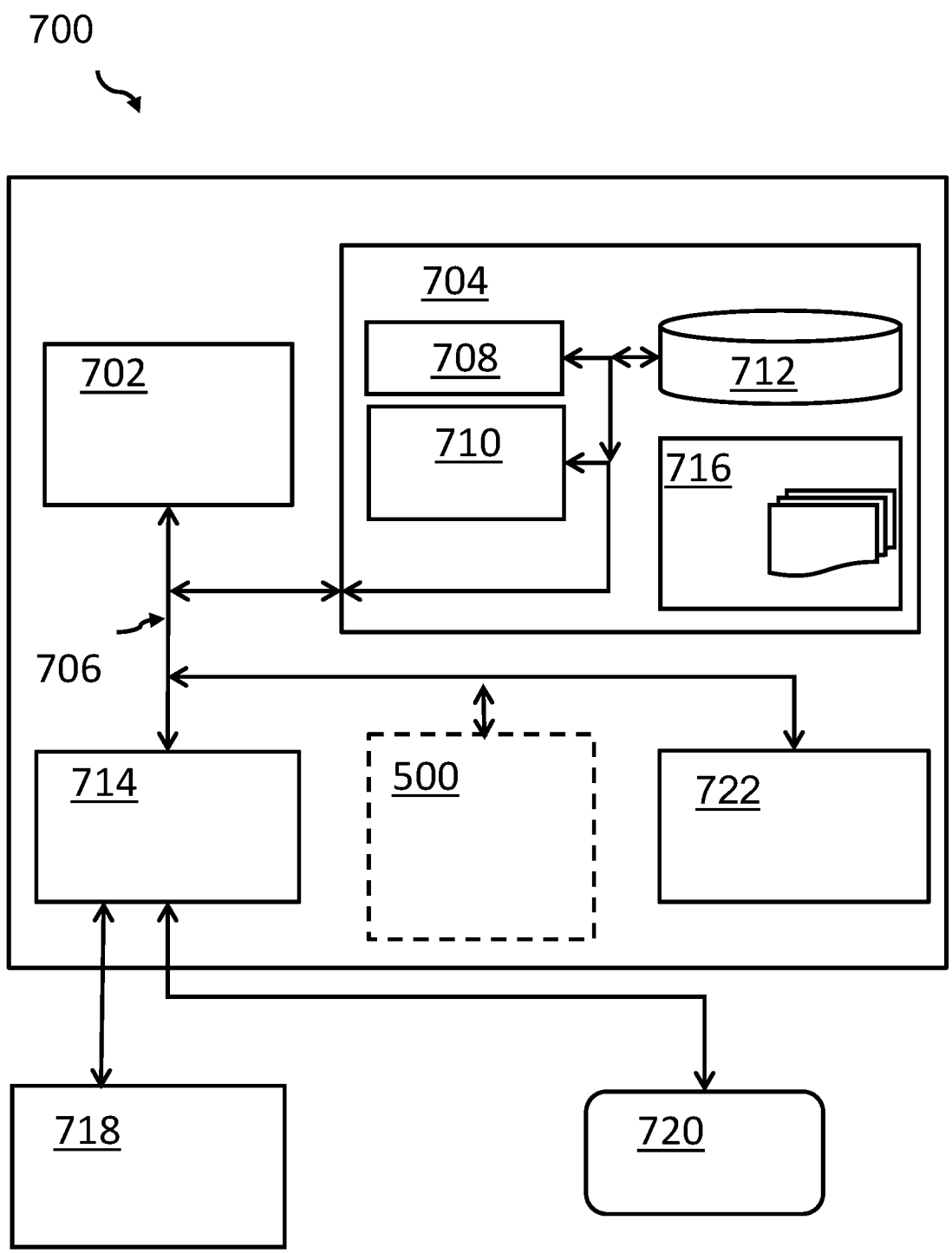

FIG. 7 shows an embodiment of a computing system comprising the system according to FIG. 5.

DETAILED DESCRIPTION

In the context of this description, the following conventions, terms and/or expressions may be used:

The term 'retaining a context' may encompass maintaining or re-establishing the linkage between the data (or at least the portion of the data) and the first and/or second metadata, e.g., in a target system. For example, the term 'retaining a context' may encompass retaining a metadata enclosure of the data, the metadata enclosure comprising the first and/or second metadata, so that a functional context of the data may be operative on the target system. E.g., retaining the context of the data may include that functions that depends on the metadata are available in the target system in an equivalent manner in comparison to the source system. In addition, the second metadata may be a synonym for any number of additional metadata for a set of data.

The term 'reside independently' may denote that the data and its context—e.g., the first and/or second metadata or functionality depending on the first and/or second metadata—may be available or transferable outside of the data store providing the data.

The term 'data' may denote any structured or unstructured information. For example, the data may be structured in a plurality of entries such as a columnar data representation or a file system or a time-line of events or notifications.

The term 'related first metadata' may denote any information about the data. For example, the first metadata may comprise parameters of functions that operate on the data such as access control. Alternatively, or additionally, the first metadata may comprise information for processing the data such as a classification schema.

The term 'data store' may denote any system—e.g., the source system—capable of providing the data at least temporarily.

The term 'universal unique identifier' or 'UUID' may denote any identifier (e.g., a pointer or index) for representing the linkage between the metadata and the data. Alternatively, or additionally, the term 'universal unique identifier' or 'UUID' may denote any identifier that is unique at least for practical purposes of using the data and the first and/or second metadata. The 'universal unique identifier' or 'UUID' may or may not be generated according to the standard methods such as a 128-bit number.

The term 'portion of the data' may denote any coherent subset of the data, e.g., an entry or column or row or node of the data or any element of structured data or an original object in the data.

The term 'portion specific first metadata' may denote a portion of the first metadata that may be related, e.g., due to the linkage and/or the UUID, the portion of the data.

The term 'independently manageable and linkable representation' may relate to a representation of the first metadata that may be transferred from the source system to the target system and/or that may be updated without changing the data (particularly, without changing the portion of the data) related to the first metadata, preferably, while at least some functionality depending on the first metadata remains operative on the data.

The term 'serializing' may denote a process of translating a data structure representing the data and/or the first metadata into a format that may be stored (for example, in a file or memory data buffer) or transmitted (e.g., across a computer network) and reconstructed later (possibly in a different computer environment). Alternatively, or additionally, the term 'serializing' may encompass encoding.

The term 'de-serializing' may denote a process which is opposite to the serialization and/or which, when bits resulting from the serialization are re-read—e.g., at the target system—according to a serialization format of the serialization, can be used to re-establish due to the UUID a semantically identical clone of the data or at least the portion of the data. For many complex objects, such as those that make extensive use of references, this process is not straightforward. The serialization of object-oriented objects does not include any of their associated methods with which they were previously linked. Alternatively, or additionally, term 'de-serializing' may encompass decoding.

The term 'second metadata' may encompass any metadata—in particular, being different to the first metadata—inside or outside of the data store providing the data, e.g., outside of a—e.g., minimum—storage architecture for providing the data.

Furthermore, any definition in the context of the first metadata, e.g., for serializing and de-serializing, may apply analogously to the second metadata. For example, the term 'related second metadata' may denote any information about the data, e.g., outside, of the data store of the data. For example, the second metadata may comprise parameters of functions that operate on the data such as access control. Alternatively, or additionally, the second metadata may comprise information for processing the data such as a classification schema.

The term 'storage architecture' may encompass data formats and/or a database management system (DBMS). Alternatively, or in addition, the term 'storage architecture' may encompass system-specific or implementation-specific formats and/or rules for providing the data (e.g., for accessing or retrieving the data). Alternatively, or additionally, the term 'storage architecture' may encompass an architecture for relating the data and the first metadata, e.g., used in the source system and/or for the data store, to provide the data. Analogously, the term 'storage architecture' may encompass an architecture for relating the data and the modified first metadata, e.g., used in the target system.

The term 'hash function value' (or briefly: 'hash value') may denote a value resulting (i.e., returned) from applying (i.e., evaluating) a hash function to the provided data, e.g., to the portion of the data. The hash function may be any function that can be used to map the provided data—e.g., the portion of the data—of arbitrary size to fixed-size values (e.g., to the UUID of the portion of the data). The values returned by the hash function may be used to index a fixed-size table (i.e., a hash table) of the first and/or second metadata.

The term 'Parquet'—in particular, Apache Parquet—may denote an exemplary columnar storage. The term 'Parquet format' may denote a compressed, efficient columnar data representation. A file format of the Parquet format may comprise the data (and optionally the first and/or second metadata) in a data block.

The term 'footer' may denote a location for storing the first and/or second metadata outside a data block comprising the data. A Parquet footer may be an example of such footer.

The term 'cloud computing' may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models and four deployment models.

Essential Characteristics of Cloud Computing Comprise:
(i) On-demand self-service. A consumer can unilaterally provision computing capabilities, such as server time and network storage, as needed automatically without requiring human interaction with each service provider.
(ii) Broad network access. Capabilities are available over the network and accessed through standard mechanisms that promote use by heterogeneous thin or thick client platforms (e.g., mobile phones, laptops, and PDAs).
(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth and virtual machines.

(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service Models for Cloud Computing used Comprise:

(i) Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment Models for Cloud Computing Comprise (i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness, low coupling, modularity, and semantic interoperability.

In the following, a detailed description of the Figures will be given. All instructions in the Figures are schematic. Firstly, a block diagram of an embodiment of the inventive computer-implemented method for retaining a context in which data resides independently of a data store from which the data originates is given. Afterwards, further embodiments, as well as embodiments of the metadata linkage system for retaining a context in which data resides independently of a data store from which the data originates will be described.

FIG. 1 shows a block diagram of a preferred embodiment of the computer-implemented method for retaining a context in which data resides independently of a data store from which the data originates. The method is generically referred to by reference sign 100.

The context may comprise metadata. The metadata may comprise first metadata, e.g. in a table of a database which also stores the data and/or which relates the first metadata to the data. Alternatively, or in addition, the metadata may comprise second metadata that is not yet related to the data, e.g., not within the database also storing the data.

In a step 102 of the method 100, data with related first metadata is provided. Both, the data and the first metadata originate from a data store. The data with the related first metadata may be provided by the data store. The data may be from a database, flat file system (e.g., a flat-file content management system or a flat-file database), etc. The data store may have a specific storage architecture, e.g., a storage architecture of a database, a file organization, etc.

The data and the related first metadata are extracted independently from the data store in a step 104 of the method 100. The first metadata may be table information in the database that is providing the data in the step 102. Herein, the extracted data and first metadata may be independent from the data store in that a later handling of the extracted data and first metadata is independent from the data store. This independency may be achieved by means of serialization.

In step 106 of the method 100, a universal unique identifier (UUID) is created for a portion of the data to which portion specific first metadata exists as part of the related first metadata. Typically, more than one UUID may be created for different chunks of the data. The portion of the first metadata related to (i.e., specific for) the portion of the data may be the complete first metadata.

The UUID of the portion of the data is integrated into the related first metadata in a step 108 of the method 100. Thereby, the step 108 creates modified first metadata as an independently manageable and/or linkable representation of the first metadata related to the portion of the data, i.e., to the original data or the data as provided in the step 102.

Embodiments of the method 100 can solve the problem of being able to retain the context in which data resides interdependently of the data store from which it originates by means of integrating the UUID in the step 108. Optionally, the integration 108 is implemented when serializing the data and serializing the first metadata to include the UUID. Furthermore, the context may be retained by re-establishing the linkage between the data and the first metadata when de-serializing the data and de-serializing the first metadata including the UUID.

FIG. 2 schematically illustrates a block diagram 200 for an exemplary implementation of the step 104 of extracting 218 the data 210 from a data store 202 (e.g., a database) and extracting 220 the related first metadata 204 independently from the data store 202.

For example, the data 202 may be represented by an optimized internal representation such as a serialized representation 203 of the original data 202. The data 202, or the serialized representation 203 of the data 202, may comprise the portion 210 to which portion 210 specific first metadata 204 exists as part 212 of the related first metadata 204, e.g., as part 212 of the serialized representation 205 of the first metadata 204 or the metadata closure (which further can comprise second metadata). The double arrow 220 shall represent the logical linkage between the data 210 and the metadata part 212.

In computer science a 'closure' may refer to the scope in which a function executes. For example, programming languages that support 'closures' in effect allow the environment in which a function executes to be associated with the function. By analogy, the context in which the data 202 resides may be referred to as the metadata closure. Alternatively, or additionally, the metadata closure collectively refers to the first and second metadata.

The serialized representation 205 may be an optimized internal representation of the metadata 204 or the metadata closure.

Optionally, the serialized representation 205 of the metadata closure comprises portions 214 and 216 of second metadata 206 and 208, respectively. Each portion 214 and 216 of the second metadata may also be related to the portion 210 of the data 202. The second metadata 206 and 208 may be a data catalog different from the database storing the data 202.

The advantages of creating a metadata closure for data 202 is that the metadata closure may be created independently of the serialization 203 of the data 202. Alternatively, or in addition, the metadata closure may be copied and/or updated independently of the serialized data 203. Alternatively, or additionally, the metadata closure may come from multiple different systems 204, 206 and 208, and not just the data store in which the data 202 resides. Furthermore, new metadata, e.g., the second metadata, may be added without requiring the recording of either the existing data 202 or the first metadata 204.

FIG. 3 schematically illustrates a block diagram 300 for an exemplary implementation of the optional step of relating second metadata to the portion 210 of the data 202.

For example, the portions 214 and 216 may be specific for the portion 210 of the data 202. The metadata closure of the portion 210 of the data 202 may comprise the portion 212 of the first metadata 204 as well as the portions 214 and 216 of the second metadata 206 and 208, respectively.

The portion 214 of the second metadata 206 is related in a step 222 to the portion 210 of the data 202. The portion 216 of the second metadata 208 is related in a step 224 to the portion 210 of the data 202.

While the exemplary implementation in FIG. 3 relates to two portions of second metadata, other embodiments may add one or more than two portions of the second metadata.

The portion 212 of the first metadata 204 that is specific for, or related to, the portion 210 of the data 202 may briefly be referred to as first metadata 212. Similarly, the portion 214 of the second metadata 206 that is specific for, or related to, the portion 210 of the data 202 may briefly be referred to as second metadata 214. Moreover, the portion 216 of the second metadata 208 that is specific for, or related to, the portion 210 of the data 202 may briefly be referred to as second metadata 216.—Also, here, the double arrows 220 shall represent the logical linkage between the data 210 and the metadata part 212. The arrows 302, 304 and 306 shall symbolize the independent usage of the metadata.

FIG. 4 schematically illustrates an exemplary implementation 400 of the step 106 of creating a UUID (labelled X in FIG. 4) and the step 108 of integrating the UUID into the related first metadata 212 and/or the related second metadata 214 and 216.

The UUID X integrated into each of the first metadata 212 and the second metadata 214 and 216, the modified first metadata 212 and the modified second metadata 214 and 216 are independently manageable and linkable to the portion 210 of the data 202. The linkage 402, 404, and 406 may be re-established based on the UUID X integrated into the metadata 212, 214, and 216, respectively, independent of the storage architecture used by the data store in which the data 202 resides.

Without loss of generality, an embodiment of the method 100 using Parquet is described to illustrate the creation of the metadata closure, e.g., the serialized representation 205 of the metadata closure, comprising the first metadata 212 and the second metadata 214 and 216.

The data 202 may comprise a data asset DataA, e.g., a table, in the data store DataStoreS.

Using existing tools such as Parquet, one can create a non-data store specific representation of the data 202, i.e., a representation 203 of the data 202 which is independent of the data store:

Encode(DataStoreS,DataA)=ParquetDataA

Herein, ParquetDataA is a file (or set of files) that represent DataA outside the context of data store 'DataStoreS'.

While existing standard formats such as Parquet have some metadata, e.g., the schema, the full context is lost.

Embodiments of the method 100 may re-create the metadata 212, 214 and 216 in a metadata store of the target system (i.e., retain the context) based on the integrated UUID. For example, ACLs may be defined based on the modified first and/or second metadata in a Cloud Object Storage (COS) service that holds the copied data 202.

The first metadata 212 may be extracted according to the step 104 by creating an additional representation of the first metadata, which is referred to as metadata aspects X, Y, etc.:

EncodeMetaDataX(DataStoreS, DataA, . . . )=ParquetMetaDataX

EncodeMetaDataY(DataStoreS, DataA, . . . )=ParquetMetaDataY

The metadata closure of the data 202, i.e., the 'DataA' in the source system may comprise:

{ParquetMetaDataX, ParquetMetaDataY}

The first metadata 204 labelled 'X' may comprise the access control list (ACL) of the data 202 labelled 'DataA' in the data store 'DataStoreS'. Alternatively, or additionally, the first metadata 204 labelled 'Y' may be the ownership of the data asset 202 or the portion 210 of the data 202.

Embodiments of the method can add second metadata from a catalog 206 held in the source system to obtain data classifications for the data 202 labelled 'DataA':

EncodeMetaDataZ(DataCatalogC, DataA)=ParquetMetaDataZ

This second metadata 206 or at least the portion 214 specific for the portion 210 of the data 202, is then also part of the metadata closure.

ParquetDataA and ParquetMetaDataX,Y,Z can be transmitted to the target system, (e.g., at a target site), e.g. within a hybrid cloud, and used to recreate the context which exists in the source system independently of what data store is used in the target system. For example, the data 202 may be stored in a S3 bucket and the ACL contained in the metadata closure may be used to configure the access control to that bucket.

In a preferred embodiment, in order to relate (i.e., connect) the data 202 to the metadata, a property of the data generated during its creation is used as Universal Unique Identifier (UUID) according to an exemplary implementation of the step 106. The UUID is integrated (e.g., stored) into the metadata files according to an exemplary implementation of the step 108.

By way of example, a Parquet footer may be used to add (e.g., an optional or arbitrary) key/values pairs. For example, by controlling or changing the encoding or serialization of the data 202, Encode(DataA), the UUID may be put into the footer. The UUID may be used within EncodeMetaData to write a field, e.g. DATA UUID.

Functions for de-serializing or decoding the modified first and/or second metadata may reproduce some or all of the context aspect X of the data in the target system (i.e., at a destination) as an exemplary implementation of the step of re-establishing the linkage 226:

DecodeMetaDataX(NewDataStoreS, ParquetDataA, ParquetMetaDataX)

Similarly, different metadata aspects 212, 214 and 216 (e.g., labelled X, Y, Z . . . ) are expressed in a generic way which is not datastore-specific and/or not system-specific whenever possible, such that they can be decoded at the destination.

Some metadata aspects, which may be entirely datastore-specific and may only be meaningful if reproduced on the same type of datastore may be excluded from being transmitted to the target system. Typically, the context may be completely retained. For example, an ACL 204 to the data 202 may be implemented in all databases or filesystems. Alternatively, or additionally, a confidentiality classification of the data 202 may not be expressed in all data stores.

In some embodiments, the de-serializing or decoding the first and/or second metadata (e.g., the function DecodeMetaDataX) may be system-specific, but may take metadata X of the data 202 coming from any other system. For example, the de-serializing or decoding of the first and/or second metadata may attempt to reproduce in the target system (i.e., the destination system) as much metadata as possible based on the modified first and/or second metadata (i.e., the encoded version of the metadata), optionally depending on the destination system capabilities.

FIG. 5 shows a block diagram of an embodiment of the metadata linkage system for retaining a context in which data resides independently of a data store from which the data originates. The system is generically referred to by reference sign 500.

The metadata linkage system 500 comprises a processor 502 and a memory 504, communicatively coupled to said processor 502, wherein said memory 504 stores program code portions that, when executed, enable the processor 502 to provide with related first metadata, both originating from a data store, thus implementing a providing unit 506 for data. The program code portions, when executed, further enable the processor 502 to extract—in particular by an extraction unit 508—the data and the related first metadata independently from the data store. The program code portions, when executed, further enable the processor 502 to create—in particular, by a creation unit 510—a UUID of a portion of the data to which portion specific first metadata exists as part of the related first metadata. The program code portions, when executed, further enable the processor 502 to integrate—in particular, by an integration unit 512—the UUID of the portion of the data into the related first metadata, thereby create modified first metadata as an independently manageable and linkable representation of the related first metadata.

It shall also be mentioned that all functional units, modules and functional blocks—in particular, the processor 502, the memory 504, the providing unit 506, the extraction unit 508, the creation unit 510, and the integration unit 512—may be communicatively coupled to each other for signal or message exchange in a selected 1:1 manner. Alternatively, the functional units, modules and functional blocks can be linked to a system internal bus system 514 for a selective signal or message exchange.

FIG. 6 shows a cloud computing environment 600 in which at least parts of the inventive concept may be deployed. A set of functional abstraction layers provided by a cloud computing environment is shown. It should be understood in advance that the components, layers, and functions, shown in FIG. 6, are intended to be only illustrative and embodiments of the invention are not limited thereto. As depicted, the following layers and corresponding functions are provided: hardware and software layers 602 include hardware and software components. Examples of hardware components include: mainframes 604; servers 606; RISC (Reduced Instruction Set Computer) architecture-based servers 608; blade servers 610; storage devices 612; networks 614 and networking components 614. In some embodiments, software components include network application server software 616 and/or database software 618.

A virtualization layer 620 provides an abstraction layer from which the following examples of virtual entities may be provided: virtual servers 622; virtual storage 624; virtual networks 626, including virtual private networks; virtual applications and operating systems 628; and virtual clients 630. In one example, management layer 632 may provide the functions described below. Resource provisioning 634 provides dynamic procurement of computing resources and other resources that are utilized to perform tasks within the cloud computing environment. Metering and pricing 636 provide cost tracking as resources are utilized within the cloud computing environment, and billing or invoicing for consumption of these resources. In one example, these resources may comprise application software licenses. Security provides identity verification for cloud consumers and tasks as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provides pre-arrangement for, and procurement of, cloud computing resources for which a future requirement is anticipated in accordance with an SLA.

Workload layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and the metadata linkage system 656 for retaining a context in which data resides independently of a data store from which the data originates.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purposes or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the metadata linkage system 500 for retaining a context in which data resides independently of a data store from which the data originates may be attached to the bus system 706.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk(DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state -setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network(LAN) or a wide area network (WAN), or the connection may be made to an external computer (for example, through the Internet using an Internet Service Provider). In some embodiments, electronic circuitry including, for example, programmable logic circuitry, field-programmable gate arrays(FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus(systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s),In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A computer-implemented method for retaining a context in which data resides independently of a data store from which the data originate, the method comprising
   providing data with related first metadata, both originating from a data store,
   extracting the data and the related first metadata independently of the data store,
   creating a universal unique identifier of a portion of the data to which portion specific first metadata exists as part of the related first metadata, and
   integrating the universal unique identifier of the portion of the data into the related first metadata, thereby creating modified first metadata as an independently manageable and linkable representation of the related first metadata.
2. The method according to clause 1, further comprising
   serializing the data independently from the first metadata, whereby a linkage between the data and the first metadata is lost,
   de-serializing the data and the first metadata independently of one another, and
   re-establishing a linkage between the data and the first metadata using the modified first metadata.
3. The method according to clause 1 or 2, further comprising
   relating second metadata to the portion of the data, and
   integrating the universal unique identifier relating to the portion of the data into the second metadata, thereby creating modified second metadata as an independently manageable and linkable representation of the related second metadata.
4. The method of according to clause 3, further comprising
   serializing the data independently of the second metadata, wherein a linkage between the data and the second metadata is lost,
   de-serializing the data and the second metadata independently of one another, and
   re-establishing a linkage between the data and the second metadata using the modified second metadata.
5. The method according to any of the preceding clauses, wherein the modified first or modified second metadata are copied or updated independently of the portion of the data.
6. The method according to any of the preceding clauses, further comprising
   storing the portion of the data and the modified first metadata according to requirements of a storage architecture which is different to the storage architecture of the data store.
7. The method according to any of the preceding clauses, wherein the universal unique identifier is created as a hash function value of the portion of the data.
8. The method according to any of the preceding clauses, wherein the data store comprises at least one of a repositories, a database, an object-storage, a file system, and a mail system.
9. The method according to any of the preceding clauses, wherein the modified first or second metadata are built according to a Parquet format.
10. The method according to clause 9, wherein the unique universal identifier is part of a footer of the Parquet format.
11. A metadata linkage system for retaining a context in which data resides independently of a data store from which the data originate, the metadata linkage system comprising a processor and a memory, communicatively coupled to said processor, wherein said memory stores program code portions that, when executed, enable the processor to
    provide data with related first metadata, both originating from a data store,
    extract the data and the related first metadata independently from the data store,
    create a universal unique identifier of a portion of the data to which portion specific first metadata exists as part of the related first metadata, and
    integrate the universal unique identifier of the portion of the data into the related first metadata, thereby create modified first metadata as an independently manageable and linkable representation of the related first metadata.
12. The metadata linkage system according to clause 11, wherein said program code portions further enable said processor to
    serialize the data independently of the first metadata, whereby a linkage between the data and the first metadata is lost,
    de-serialize the data and the first metadata independently of one another, and
    re-establish a linkage between the data and the first metadata using the modified first metadata.
13. The metadata linkage system according to claim 11 or 12, wherein said program code portions further enable said processor to
    relate second metadata to the portion of the data, and
    integrate the universal unique identifier relating to the portion of the data into the second metadata, thereby create modified second metadata as an independently manageable and linkable representation of the related second metadata.
14. The metadata linkage system according to clause 13, wherein said program code portions further enable said processor to
    serialize the data independently of the second metadata, wherein a linkage between the data and the second metadata is lost, de-serialize the data and the second metadata independently of one another, and
re-establish a linkage between the data and the second metadata using the modified second metadata.
15. The metadata linkage system according to any of the clauses 11 to 14, wherein said program code portions further enable said processor to
copy or update the modified first or modified second metadata independently of the portion of the data.
16. The metadata linkage system according to any of the clauses 11 to 15, wherein said program code portions further enable said processor to
store the portion of the data and the modified first metadata according to requirements of a storage architecture which is different to the storage architecture of the data store.
17. The metadata linkage system according to any of the clauses 11 to 16, wherein said program code portions that enable said processor to create the universal unique identifier further enable said processor to create the universal unique identifier as a hash function value of the portion of the data.
18. The metadata linkage system according to any of the clauses 11 to 17, wherein the data store comprises at least one of a repository, a database, an object-storage, a file system, and a mail system.
19. The metadata linkage system according to any of the clauses 11 to 18, wherein said program code portions further enable said processor to
build the modified first or second metadata according to a Parquet format.
20. A computer program product for retaining a context in which data resides independently of a data store from which the data originates, the computer program product comprising a computer readable storage medium having program instructions embodied therewith, said program instructions being executable by one or more computing systems or controllers to cause said one or more computing systems to
provide data with related first metadata, both originating from a data store,
extract the data and the related first metadata independently from the data store,
create a universal unique identifier of a portion of the data to which portion specific first metadata exists as part of the related first metadata, and
integrate the universal unique identifier of the portion of the data into the related first metadata, thereby creating modified first metadata as an independently manageable and linkable representation of the related first metadata.

What is claimed is:
1. A computer-implemented method for retaining a context in which data resides independently of a data store from which the data originate, the method comprising:
providing data with related first metadata, both originating from a data store, wherein the first metadata comprises parameters of functions that operate on the data, including access control information;
extracting the data and the related first metadata independently of the data store;
creating a universal unique identifier of a portion of the data to which portion specific first metadata exists as part of the related first metadata; and
integrating the universal unique identifier of the portion of the data into the related first metadata, thereby creating modified first metadata as an independently manageable and linkable representation of the related first metadata.
2. The method according to claim 1, further comprising:
serializing the data independently from the first metadata, whereby a linkage between the data and the first metadata is lost;
de-serializing the data and the first metadata independently of one another; and
re-establishing a linkage between the data and the first metadata using the modified first metadata.
3. The method according to claim 1, further comprising:
relating second metadata to the portion of the data; and
integrating the universal unique identifier relating to the portion of the data into the second metadata, thereby creating modified second metadata as an independently manageable and linkable representation of the related second metadata.
4. The method according to claim 3, further comprising:
serializing the data independently of the second metadata, wherein a linkage between the data and the second metadata is lost;
de-serializing the data and the second metadata independently of one another; and
re-establishing a linkage between the data and the second metadata using the modified second metadata.
5. The method according to claim 1, wherein the modified first or modified second metadata are copied or updated independently of the portion of the data.
6. The method according to claim 1, further comprising:
storing the portion of the data and the modified first metadata according to requirements of a storage architecture which is different to the storage architecture of the data store.
7. The method according to claim 1, wherein the universal unique identifier is created as a hash function value of the portion of the data.
8. The method according to claim 1, wherein the data store comprises at least one of a repository, a database, an object-storage, a file system, and a mail system.
9. The method according to claim 1, wherein the modified first or second metadata are built according to a Parquet format.
10. The method according to claim 9, wherein the unique universal identifier is part of a footer of the Parquet format.
11. A metadata linkage system for retaining a context in which data resides independently of a data store from which the data originate, the metadata linkage system comprising a processor and a memory, communicatively coupled to said processor, wherein said memory stores program code portions that, when executed, enable the processor to:
provide data with related first metadata, both originating from a data store, wherein the first metadata comprises parameters of functions that operate on the data, including access control information;
extract the data and the related first metadata independently from the data store;
create a universal unique identifier of a portion of the data to which portion specific first metadata exists as part of the related first metadata; and
integrate the universal unique identifier of the portion of the data into the related first metadata, thereby create modified first metadata as an independently manageable and linkable representation of the related first metadata.
12. The metadata linkage system of claim 11, wherein said program code portions further enable said processor to:

serialize the data independently of the first metadata, whereby a linkage between the data and the first metadata is lost;
de-serialize the data and the first metadata independently of one another; and
re-establish a linkage between the data and the first metadata using the modified first metadata.

13. The metadata linkage system according to claim 11, wherein said program code portions further enable said processor to:
relate second metadata to the portion of the data; and
integrate the universal unique identifier relating to the portion of the data into the second metadata, thereby create modified second metadata as an independently manageable and linkable representation of the related second metadata.

14. The metadata linkage system according to claim 13, wherein said program code portions further enable said processor to:
serialize the data independently of the second metadata, wherein a linkage between the data and the second metadata is lost;
de-serialize the data and the second metadata independently of one another, and
re-establish a linkage between the data and the second metadata using the modified second metadata.

15. The metadata linkage system according to claim 11, wherein said program code portions further enable said processor to:
copy or update the modified first or modified second metadata independently of the portion of the data.

16. The metadata linkage system according to claim 11, wherein said program code portions further enable said processor to:
store the portion of the data and the modified first metadata according to requirements of a storage architecture which is different to the storage architecture of the data store.

17. The metadata linkage system according to claim 11, wherein said program code portions that enable said processor to create the universal unique identifier further enable said processor to create the universal unique identifier as a hash function value of the portion of the data.

18. The metadata linkage system according to claim 11, wherein the data store comprises at least one of a repository, a database, an object-storage, a file system, and a mail system.

19. The metadata linkage system according to claim 11, wherein said program code portions further enable said processor to:
build the modified first or second metadata according to a Parquet format.

20. A computer program product for retaining a context in which data resides independently of a data store from which the data originates, the computer program product comprising a computer readable storage medium having program instructions embodied therewith, said program instructions being executable by one or more computing systems or controllers to cause said one or more computing systems to:
provide data with related first metadata, both originating from a data store, wherein the first metadata comprises parameters of functions that operate on the data, including access control information;
extract the data and the related first metadata independently from the data store;
create a universal unique identifier of a portion of the data to which portion specific first metadata exists as part of the related first metadata; and
integrate the universal unique identifier of the portion of the data into the related first metadata, thereby creating modified first metadata as an independently manageable and linkable representation of the related first metadata.

* * * * *